Aug. 6, 1940.  R. V. TURNER  2,210,272
TRANSPORTABLE MINNOW PAIL DEVICE
Filed May 12, 1939
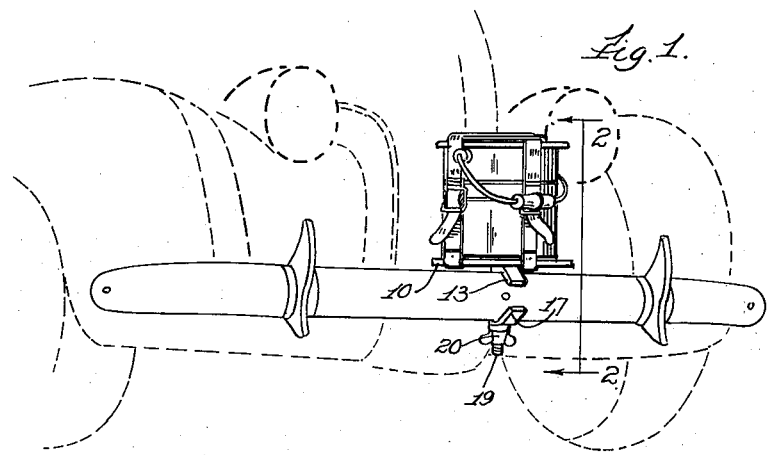
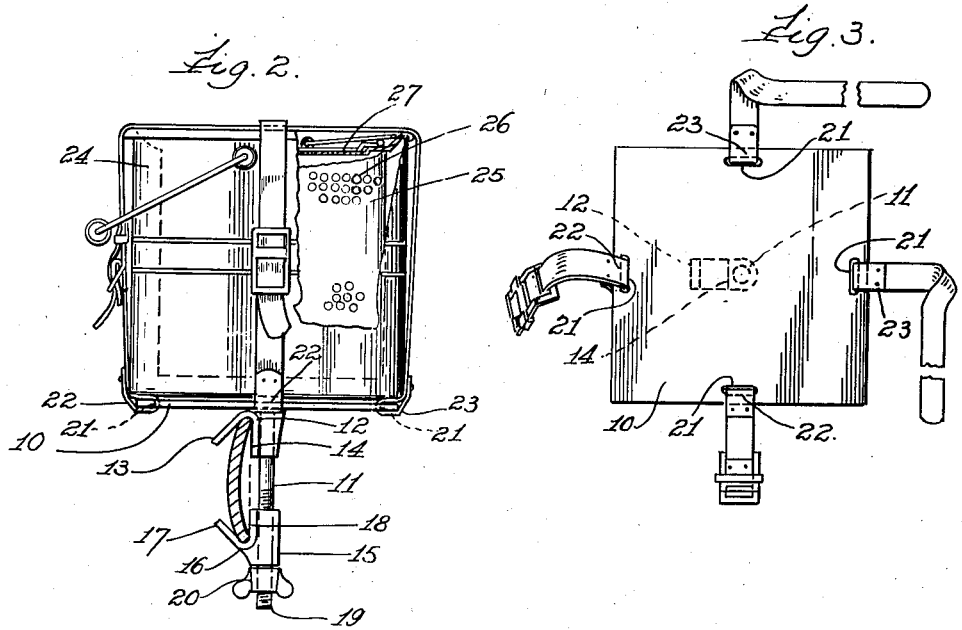
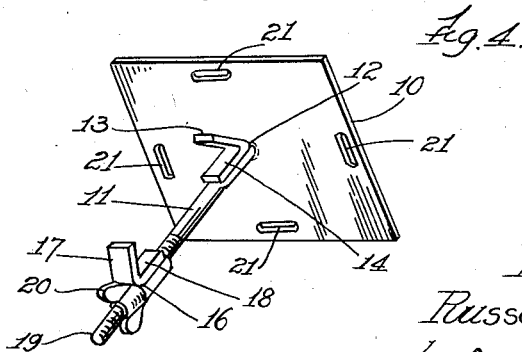
Inventor
Russell V. Turner
by James R. McKnight
his Attorney.

Patented Aug. 6, 1940

2,210,272

UNITED STATES PATENT OFFICE 2,210,272

TRANSPORTABLE MINNOW PAIL DEVICE

Russell V. Turner, Chicago, Ill.

Application May 12, 1939, Serial No. 273,160

1 Claim. (Cl. 224—29)

My invention relates to a device whereby a minnow pail may be attached to and carried by the front bumper of an automobile.

It has long been known that maximum results are best obtained in fishing by the use of live bait, such as minnows, shrimps, and the like. Ordinarily such live bait cannot be purchased at the places where the fishing is to be done, but has to be bought in metropolitan centers and carried to the fishing spots. This involves the problem of transporting the live bait in such a manner that it will still be live bait when it is to be used.

Among the objects of my invention is to solve the above problem of transportation of live bait by providing a carrier adapted to be attached to the front bumper of an automobile and having a platform for supporting a minnow pail thereon, and adjustable means for holding the pail on the platform. My invention also contemplates such other objects, advantages and capabilities as will later more fully appear and which are inherently possessed by my invention.

While I have shown in the accompanying drawing a preferred form of my invention yet I desire it understood that the same is susceptible of modification and change without departing from the spirit of my invention.

Referring to the drawing, Fig. 1 is a perspective view of my transportable minnow pail device attached to the front bumper of an automobile; Fig. 2 is a side elevation on line 2—2 of Fig. 1 with the parts broken away disclosing the interior of the minnow pail; Fig. 3 is a top plan view showing my platform and straps, and Fig. 4 is a perspective view of my device taken from below with the straps removed.

The embodiment selected to illustrate my invention comprises a platform 10 to the bottom portion of which is attached or formed integral therewith a downwardly extending support 11. Attached to the support 11 adjacent its upper portion is a fixed hook 12 having a downwardly and outwardly curved portion 13 and a flat portion 14. Slidable on support 11 is a collar 15 to which is attached or formed integral therewith a hook 16 having an upwardly and outwardly curved portion 17 and a flat portion 18. The lower portion 19 of the support 11 is screw threaded. A screw threaded thumb nut 20 is movable by manual operation on the screw threaded portion 19 of support 11.

Preferably at the central edge portions of the four sides of my platform are cut-out portions 21, each of which receives the bent over end of a strap 22 or 23.

In use, let us assume that the user is a fisherman about to start on his automobile journey to the place where he is going to fish. The fisherman has placed his live bait in a minnow pail 24 which contains water and has a container portion 25, holes 26, and a top 27. He approaches the front bumper of his automobile, which has a curved front and straight back. He places the top fixed hook over the bumper so that the flat portion 14 is against the flat back portion of the bumper and the curved portion 13 is against the curved front portion of the bumper. The collar 15 is then moved on the support 11 until the flat portion 18 of the lower movable hook 16 is against the flat back portion of the bumper and the curved portion 17 is against the front curved portion of the bumper. The thumb nut 20 is then screwed on screw threaded portion 19 of support 11 until the nut is snug against lower hook 16 to hold it in fixed position. The minnow pail 24 is now placed on the platform 10. Two of the straps 23 are long and are placed over the sides and top of the minnow pail 24 to meet corresponding shorter straps 22 on opposite sides, and to be attached or held thereto by any suitable means such as snaps, buckles or the like.

With the minnow pail in this position the fisherman may proceed with his automobile, with the security that the minnows will receive sufficient air so that they may later be used as live bait. No longer need the fisherman put the minnow pail on the front or back seat of his car, have water splash and the bait die for lack of air or change of temperature. When the fisherman reaches his fishing place all he has to do is to release the straps and remove the minnow pail from the platform. When not in use my holding device can be readily removed from the bumper and placed in the car where it will take up little space. The economies in manufacture of my device are substantial, and in use it is adjustable to fit any depth of bumper and to hold any conventional size or shape minnow pail.

While I have indicated that my carrier is adapted to be attached to the front bumper, yet I wish it understood that the carrier may also be attached to the rear bumper without departing from the spirit of my invention.

Having thus described my invention, I claim:

In combination with a minnow pail having a container portion, holes for aeration and a top, and the front bumper of an automobile having a flat back portion and a curved front portion, said bumper being exposed to the atmosphere, a transportable and removable carrier comprising a platform, a support attached to the bottom of said platform and extending thereunder, a top fixed hook attached to said support, said hook having a flat portion and an outwardly and downwardly extending curved portion, a collar movable on said support, a lower hook attached to said collar and having a flat portion and an upwardly and outwardly extending curved portion, said upper fixed hook adapted to fit over the top of the bumper of the automobile so that the flat portion of the hook is against the flat back of the bumper and the curved portion of the hook is against the curved front of the bumper, said lower hook movable to fit under the bottom of said automobile bumper so that the flat portion of the hook is against the flat back of the bumper and the curved portion of the hook is against the curved front of the bumper, said support having a lower screw threaded portion, a screw threaded thumb nut movable on said support so as to hold the movable collar and hook in desired fixed position, said platform adapted to receive thereon said minnow pail, said platform having centrally positioned cut-out portions at its side edges, straps passing through said cut-out portions and attached thereby to said platform, said straps adapted to extend over the sides and top of the minnow pail, and means on said straps for holding said straps against said minnow pail to firmly position said minnow pail on said platform, said carrier adapted in combination with the air exposed minnow pail and automobile bumper to transport the minnows in the pail to the fishing place in live condition.

RUSSELL V. TURNER.